(No Model.)
J. C. HACKETT.
HAME FASTENER.
No. 383,727.                    Patented May 29, 1888.
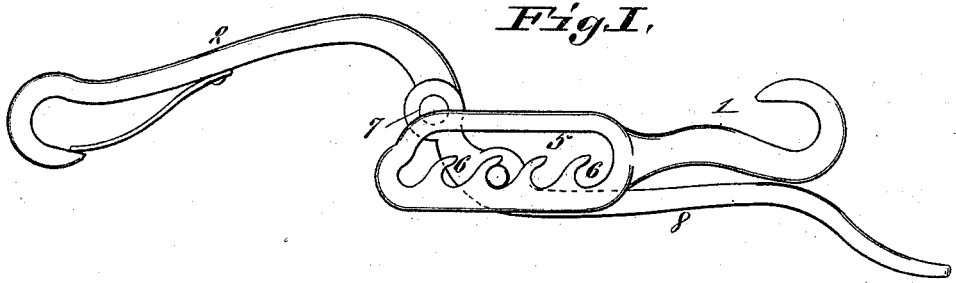
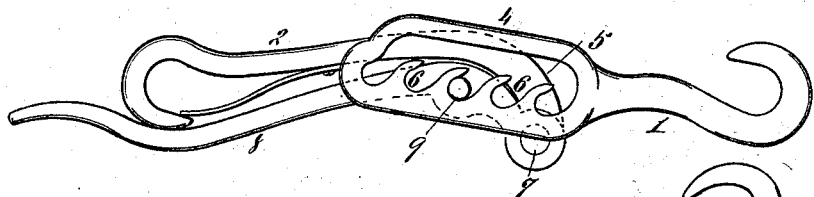
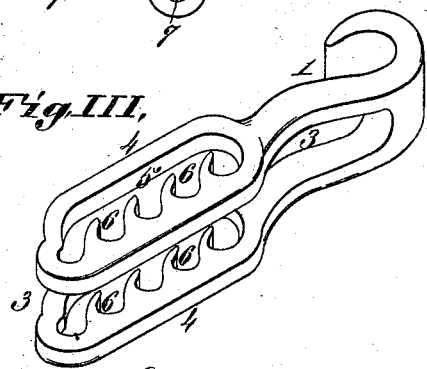
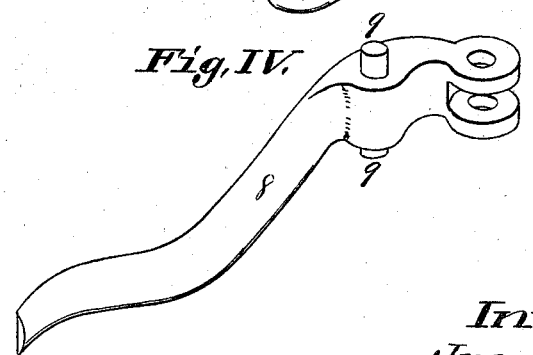
Attest:
Emma Arthur.
E. Oehley.
Inventor:
Jno. C. Hackett,
By Knight Bros
attys.

UNITED STATES PATENT OFFICE.

JOHN C. HACKETT, OF ST. LOUIS, MISSOURI.

HAME-FASTENER.

SPECIFICATION forming part of Letters Patent No. 383,727, dated May 29, 1888.

Application filed December 14, 1887. Serial No. 257,902. (No model.)

*To all whom it may concern:*

Be it known that I, JOHN C. HACKETT, of the city of St. Louis, in the State of Missouri, have invented a certain new and useful Improvement in Hame-Fasteners, of which the following is a full, clear, and exact description, reference being had to the accompanying drawings, forming part of this specification, and in which—

Figure I is a side elevation showing the fastener open. Fig. II is a similar view showing it closed. Fig. III is a perspective view of the ratchet member of the fastener, and Fig. IV is a perspective view of the lever.

My invention relates to an improvement in that class of hame-fasteners in which two hooks are used to engage the respective lower ends of the hames, one of said hooks being provided with a lever having pivotal connection with the other member.

My invention consists in features of novelty hereinafter fully described, and pointed out in the claim.

Referring to the drawings, 1 represents a hook for engaging the lower end of one of the hames, and 2 a hook for engaging the lower end of the other hame. The hook 1 is slotted longitudinally, as shown at 3, to form ears 4. These ears are slotted lengthwise, as shown at 5, and on one side they are provided with ratchet-teeth 6, preferably curved toward the point of the hook, as shown. To the hook 2 is pivoted or hinged at 7 a lever, 8. This lever fits in the slot or opening 3 of the hook 1, and it is provided with arbors or journals 9, (one on each side,) which fit in the slots or openings 5 of the ears 4 of the hook 1, and which engage in the ratchet-teeth 6, as shown in Figs. I and II.

In opening the fastener the lever is moved into the position shown in Fig. I, and in closing it to tighten the hames on the collar the lever is moved into the position shown in Fig. II, when the arbors or journals 9 will be above the pivot-point 7 of the lever, and thus the device automatically fastens or locks itself. I, however, claim no invention in this, *per se.*

My invention relates to the ratchet-teeth to receive the journals or arbors 9 of the lever for the purpose of adjusting the length of the fastening, and it will be understood the arbors or journals may be placed in any pair of the ratchet-teeth desired, so that the distance between the points of the hooks 1 and 2 may be lengthened or shortened in a short space of time.

I claim as my invention—

In a hame-fastener, the combination of hook 1, having slot 3, forming ears 4, ratchet-teeth 6 in the ears 4, hook 2, lever 8, pivoted to the hook 2, and arbors or journals 9 on the lever engaging the ratchet-teeth in the ears on hook 1, substantially as and for the purpose set forth.

JOHN C. HACKETT.

In presence of—
GEO. H. KNIGHT,
EDWD. S. KNIGHT.